US012609596B2

(12) United States Patent
Appeltauer et al.

(10) Patent No.: US 12,609,596 B2
(45) Date of Patent: Apr. 21, 2026

(54) AXIAL FLOW MACHINE FOR A MOTOR VEHICLE

(71) Applicant: MERCEDES-BENZ GROUP AG, Stuttgart (DE)

(72) Inventors: Peter Appeltauer, Fellbach (DE); Tobias Haerter, Stuttgart (DE); Andreas Kolb, Wernau (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 220 days.

(21) Appl. No.: 18/716,658

(22) PCT Filed: Nov. 18, 2022

(86) PCT No.: PCT/EP2022/082494
§ 371 (c)(1),
(2) Date: Jun. 5, 2024

(87) PCT Pub. No.: WO2023/104480
PCT Pub. Date: Jun. 15, 2023

(65) Prior Publication Data
US 2025/0038632 A1 Jan. 30, 2025

(30) Foreign Application Priority Data

Dec. 6, 2021 (DE) ..................... 10 2021 006 008.3

(51) Int. Cl.
*H02K 21/24* (2006.01)
*H02K 5/173* (2006.01)
(Continued)

(52) U.S. Cl.
CPC .......... *H02K 21/24* (2013.01); *H02K 5/1737* (2013.01); *H02K 7/088* (2013.01); *H02K 9/19* (2013.01)

(58) Field of Classification Search
CPC .......... F16D 1/033; H02K 1/32; H02K 16/02; H02K 21/24; H02K 5/10; H02K 5/124;
(Continued)

(56) References Cited

U.S. PATENT DOCUMENTS 5,279,183 A  1/1994  Forster et al.
6,087,753 A  7/2000  Pinkerton
(Continued)

FOREIGN PATENT DOCUMENTS

DE          4013298 A1   10/1991
DE     102014011782 A1    2/2016
(Continued)

OTHER PUBLICATIONS

International Search Report and Written Opinion mailed Mar. 3, 2023 in related/corresponding International Application No. PCT/EP2022/082494.
(Continued)

*Primary Examiner* — Naishadh N Desai
(74) *Attorney, Agent, or Firm* — PATENT PORTFOLIO BUILDERS PLLC

(57) ABSTRACT

An axial flow machine for a motor vehicle includes a stator having two rotors that can be rotated in relation to the stator. The stator is arranged between the rotors in the axial direction of the axial flow machine. The rotors are connected to each other in a rotationally fixed manner by means of respective toothings of the rotors, said toothings being arranged on sides of the rotors facing towards each other in the axial direction.

12 Claims, 2 Drawing Sheets

Figure 1:
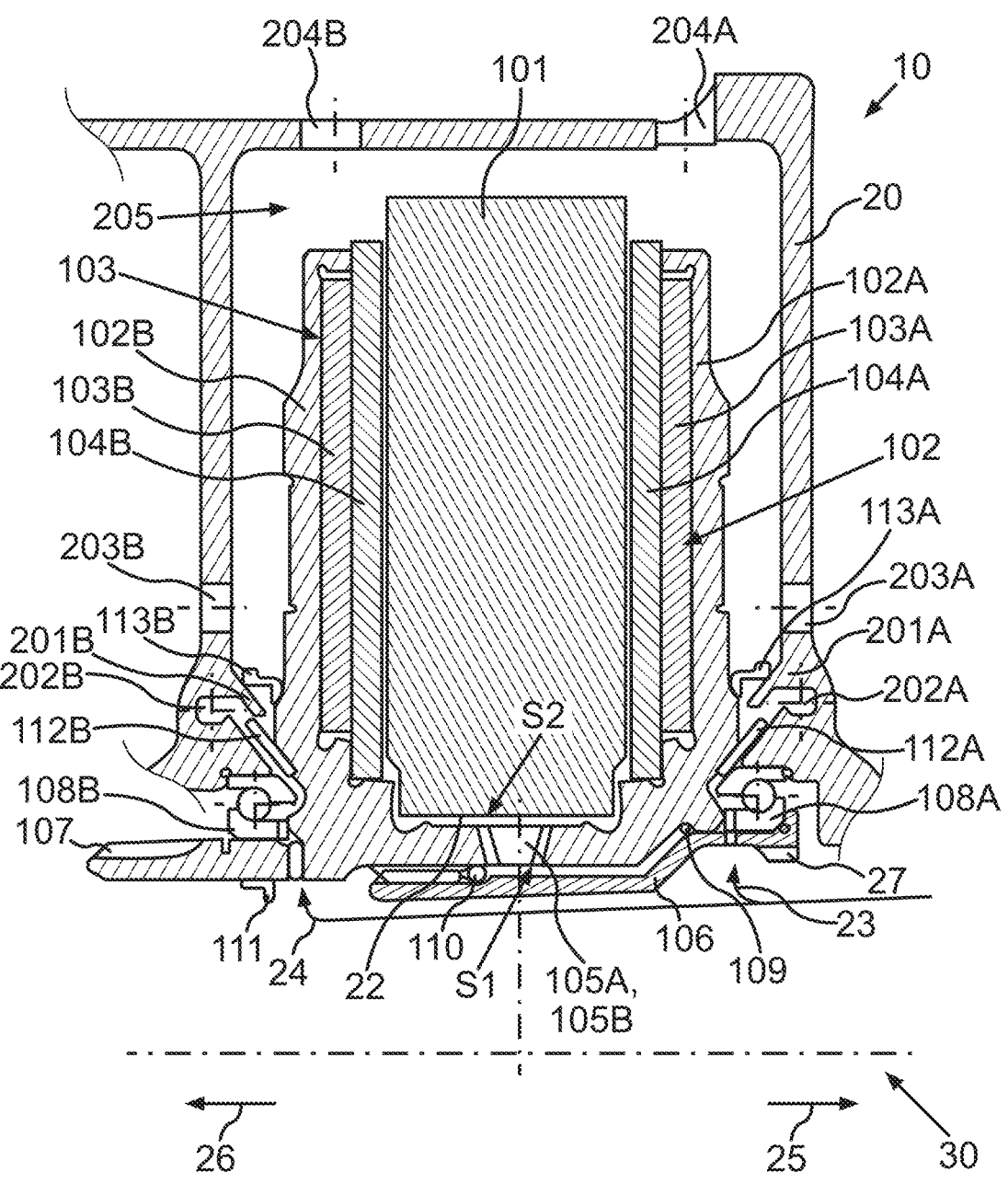

(51) Int. Cl.
    *H02K 7/08*         (2006.01)
    *H02K 9/19*         (2006.01)

(58) Field of Classification Search
    CPC .... H02K 5/1735; H02K 5/1737; H02K 7/003;
             H02K 7/006; H02K 7/088; H02K 9/19;
             F24F 1/0018; F24F 11/81; F24F 13/20;
             F24F 7/007; G06Q 30/02
    See application file for complete search history.

(56) References Cited

U.S. PATENT DOCUMENTS

| | | | |
|---|---|---|---|
| 11,413,946 B2 | 8/2022 | Absenger et al. | |
| 2008/0231131 A1* | 9/2008 | Gabrys | H02K 3/47 |
| | | | 310/195 |
| 2020/0132123 A1* | 4/2020 | Birle | F16D 1/076 |
| 2020/0132165 A1* | 4/2020 | Yan | H02K 1/182 |
| 2022/0278579 A1 | 9/2022 | Bossecker et al. | |
| 2022/0368202 A1 | 11/2022 | Bossecker et al. | |
| 2023/0231454 A1 | 7/2023 | Witt et al. | |

FOREIGN PATENT DOCUMENTS

| | | |
|---|---|---|
| DE | 102018123116 A1 | 3/2020 |
| DE | 102020104857 A1 | 12/2020 |
| DE | 102019125871 A1 | 3/2021 |
| DE | 102020114855 B3 | 9/2021 |
| WO | 2020069744 A1 | 4/2020 |
| WO | 2021032236 A1 | 2/2021 |

OTHER PUBLICATIONS

Office Action created Mar. 30, 2022 in related/corresponding DE Application No. 10 2021 006 008.3.
WIKIPEDIA; "Hirth-Verzahnung;" Oct. 25, 2021; https://de.wikipedia.org/w/index.php?title=Hirth- Verzahnung&oldid=216684276.
Wittel et al.; "Roloff/Matek Maschinenelemente, Normung, Berechnung Gestaltung;" Edition 21; Springer 2013; pp. 387-388.

\* cited by examiner

AXIAL FLOW MACHINE FOR A MOTOR VEHICLE

BACKGROUND AND SUMMARY OF THE INVENTION

Exemplary embodiments of the invention relate to an axial flow machine for a motor vehicle, in particular for a car.

DE 40 13 298 A1 discloses fastening a flywheel to a crankshaft of an internal combustion engine using a central screw inserted into the crankshaft. Furthermore, an electric drive for driving a motor vehicle is known from WO 2020/069744 A1, having a housing arrangement and an electrical engine having a motor shaft formed as a hollow shaft, which motor shaft can be driven by the electric engine to rotate around an axis of rotation. Furthermore, a disc machine for a motor vehicle drive is known from WO 2021/032236 A1.

Exemplary embodiments of the present invention are directed to an axial flow machine for a motor vehicle, such that a particularly compact and secure connection of rotors of the axial flow machine can be achieved.

The invention relates to an axial flow machine for a motor vehicle, in particular for a car. This means that the axial flow machine, also referred to as a disc machine, can be used for a drivetrain of a motor vehicle, such that the motor vehicle can be driven, in particularly entirely, electrically by means of the axial flow machine. Thus, the axial flow machine is, in particular, a traction engine, by means of which the motor vehicle can be driven, in particular entirely, electrically. The motor vehicle is thus, for example, a hybrid vehicle or even an electric vehicle, in particular a battery electric vehicle (BEV). The axial flow machine has a stator, in particular exactly one, and two rotors, in particular exactly two, that can be rotated in relation to the stator. In particular, the rotors can be rotated in relation to the stator around a machine axis of rotation. For example, the rotors can be driven by means of the stator and thus can be rotated in relation to the stator, in particular around the machine axis of rotation. Here, the stator is arranged between the rotors in the axial direction of the axial flow machine and thus in the axial direction of the rotors and of the stator. This is to be understood, in particular, to mean that at least one part, in particular at least one predominant part, of the stator or the entire stator is arranged between respective, in particular at least predominant, partial regions of the rotors in the axial direction of the axial flow machine, such that, for example, a first of the rotors has a first of the partial regions and the second rotor has a second of the partial regions. Here, the first partial region, for example, is overlapped or covered by the stator or by the part of the stator towards the second partial region in the axial direction of the axial flow machine, and the second partial region is overlapped or covered by the stator or by the part of the stator towards the first partial region in the axial direction of the axial flow machine. The axial direction of the axial flow machine and thus the axial direction of the rotors and the stator coincide and run along the machine axis of rotation or coincide with the machine axis of rotation. Thus, when we talk of the axial direction of the axial flow machine, this is also to be understood as the axial direction of the respective rotor and the axial direction of the stator and vice versa.

Since the stator is arranged between the rotors in the axial direction of the axial flow machine, i.e., when viewed along the machine axis of rotation, the axial flow machine is formed according to the so-called H-construction. For example, the respective rotor is at least substantially disc-shaped, such that the respective rotor is also referred to as a disc runner. For example, the respective rotor is a magnet carrier. This means, in particular, that respective magnets, in particular permanent magnets, can be held on the respective rotor, such that the respective magnets are supported by the respective rotor. Thus, the respective magnets can also be rotated with the respective rotor, on which the respective magnets are held, in relation to the stator around the machine axis of rotation. Furthermore, it is conceivable that at least one or more inductors are held on the stator. The inductor can be energized. This means that an electric current can flow through the inductor. Thus, the stator, for example, supports the inductor. In particular, the axial flow machine can have a housing, wherein the rotors can be rotated in relation to the housing around the machine axis of rotation. Here, it is provided, in particular, that the stator is fixed. This means that the stator is connected to the housing in a rotationally fixed manner. Since the stator is arranged between the rotors in the axial direction of the axial flow machine, the stator is also referred to as the central stator. In particular by energizing the inductors, i.e., by an electric current being conducted through the inductor or through the inductors, the rotors can be driven and thus rotated in relation to the stator, and also preferably in relation to the housing, in particular around the machine axis of rotation.

Furthermore, it is preferably provided that a first air gap is arranged between the stator and a first of the rotors in the axial direction of the axial flow machine. Furthermore, it is preferably provided that a second air gap is arranged between the stator and the second rotor in the axial direction of the axial flow machine. In particular, the respective air gap can be at least substantially disc-shaped.

In order to now be able to connect the rotors to one another in a particularly compact and secure manner, i.e., in a fixed manner, it is provided according to the invention that the rotors, in particular by bypassing the stator, are connected to one another in a form-fit and rotationally fixed manner by means of respective toothings of the rotors arranged on sides of the rotors facing towards one another in the axial direction and, in particular, interlocked with one another. In other words, the first rotor has a first of the sides facing towards one another in the axial direction of the axial flow machine, and the second rotor has a second of the sides of the rotors facing towards one another in the axial direction. Expressed differently again, a first of the sides is a side of the first rotor, and a second of the sides is a side of the second rotor. The sides of the rotors are also referred to as front sides. Thus, the first side of the first rotor is a first front side of the first rotor, and the second side of the second rotor is a second front side of the second rotor. The front sides of the rotors are facing one another in the axial direction of the axial flow machine. Here, a first of the toothings is arranged on the first front side. In other words, the first front side has the first toothing. A second of the toothings is arranged on the second front side, such that the second front side has the second toothing. The toothings are interlocked with each other, in particular directly. This means that the toothings engage into each other. This is to be understood, in particular, to mean that the first toothing has first teeth and first tooth gaps, wherein the first teeth and the first tooth gaps follow on from one other alternatingly in the peripheral direction of the first rotor running around the axial direction of the axial flow machine in such a way that a first tooth gap, in particular exactly one, is arranged between two directly adjacent first teeth in the peripheral direction of the first rotor or the axial flow machine. Correspondingly, the second toothing has second teeth and second tooth gaps, wherein the second teeth and the second tooth gaps follow on from one another alternatingly in the peripheral direction of the second rotor and thus the axial flow machine running around the axial direction of the axial flow machine, in particular in such a way that a second tooth gap, in particular exactly one, is arranged between two directly adjacent second teeth in the peripheral direction of the second rotor. Here, the first teeth engage in the second tooth gaps, and the second teeth engage in the first tooth gaps, whereby the toothings interlock with each other. In doing so, the rotors are connected to one another in an overall form-fit and rotationally fixed manner in the peripheral direction of the rotors and thus of the axial flow machine running around the axial direction of the axial flow machine and thus around the machine axis of rotation.

The preferably provided feature that the rotors are connected to one another in a rotationally fixed manner by means of the toothings by bypassing the stator is to be understood to mean that the rotors are not connected to one another in a rotationally fixed manner via the stator, i.e., not using the stator, therefore bypass the stator with regards to their rotationally fixed connection to one another.

Since the front sides of the rotors are facing towards one another in the axial direction of the axial flow machine, the front sides are also referred to as axial front sides or axial sides. The front sides lie opposite one another in the axial direction of the axial flow machine.

Preferably, the respective toothing is arranged concentrically to the machine axis of rotation. Furthermore, it is provided, for example, that the respective toothing is provided or arranged at or on a respective circular ring face of the respective front side.

It has proved to be particularly advantageous when the toothings are formed as Hirth toothings. Expressed differently, the toothings form a Hirth toothing. In doing so, particularly high demands on the co-axiality of the rotors and accuracy of fit and position of the rotors, in particular in relation to one another and in particular in the axial direction of the axial flow machine and in the radial direction of the axial flow machine and in terms of an angular division, can also be met for the rotationally fixed connection of the two rotors in their assembly. Moreover, the Hirth toothing enables an at least virtually play-free, form-fit and rotationally fixed connection of the rotors to each other, such that torsional moments, in particular variable torsional moments, can be particularly advantageously transmitted, in particular independently of their sense of direction, in particular between the rotors and especially particularly via the toothings, i.e., via the Hirth toothings.

In order to be able to connect the rotors to each other by means of the toothings in a manner particularly favorable in terms of construction space, it is provided in a further design of the invention that the stator has an, in particular, central through opening, which is preferably arranged concentrically to the machine axis of rotation. Here, the toothings are arranged in the through opening, in particular completely in each case. Thus, it is conceivable, in particular, that the respective toothing is overlapped or covered by the stator outwardly in the radial direction of the axial flow machine at least partially, in particular at least predominantly and thus by at least more than half or even completely. Thus, in comparison to conventional solutions, it can be achieved that an inner region of the axial flow machine is built to be smaller or narrower in the radial direction of the axial flow machine.

A further embodiment is characterized in that the rotors and thus the toothings are braced together in the axial direction of the axial flow machine by means of a screw element. In doing so, the toothings are held in engagement with each other. Thus, a fixed, form-fit and rotationally fixed connection of the rotors to each other that is favorable in terms of construction space can be ensured. Particularly advantageously, the screw element is in combination with the Hirth toothings, since the Hirth toothings can ensure an advantageous torsional moment transfer between the rotors, such that the screw element at least predominantly, in particular exclusively, serves to axially brace the rotors and thus the toothings together. In other words, the rotors do not have to be braced together by means of the screw element so strongly in the axial direction that a torsional moment transferring connection between the rotors is achieved by this bracing, since such a torsional moment transferring connection can be ensured by the Hirth toothings. An alternative solution relating to this in which the rotors are connected to a shaft common to the rotors via a respective plugin toothing in a torsional moment transferring manner, such that the rotors would be connected to each other via the plugin toothings and via the shaft in a torsional moment transferring manner, in particular in a rotationally fixed manner, would require for example eight screws, in particular distributed peripherally, in order to ensure a sufficient, torsional moment transferring connection of the rotors via the plugin toothings and the shaft. These eight screws would, however, require a large construction space in the radial direction of the axial flow machine, such that a thick rotor hub of the respective rotor would be required. This can now be avoided.

In order to be able to keep the requirements for construction space and the weight of the axial flow machine particularly small, it is provided in a further design of the invention that the screw element is formed to be hollow, in particular across its entire axial extension, i.e., running in the axial direction of the axial flow machine, such that the screw element is preferably formed as a hollow screw.

Here, it has proved to be particularly advantageous when the screw element is arranged at least partially in the through opening. In particular, it is conceivable that the screw element penetrates the through opening and protrudes out of the through opening on both sides, for example in the axial direction of the axial flow machine. As a result of the arrangement of the screw element in the through opening, the rotors and thus the toothings can be braced together in a manner that is particularly favorable in terms of construction space, since the rotors or the toothings can be axially braced together radially within the stator.

A further embodiment is characterized in that the screw element formed, in particular, separately from the rotors is sealed against the first rotor by means of a first sealing element and against the second rotor by means of a second sealing element, wherein the sealing elements are spaced apart from each other in the axial direction of the axial flow machine. In particular, the sealing elements are formed separately from each other. Preferably, the respective sealing element is formed of rubber. For example, the respective sealing element is formed as a sealing ring, in particular as an O-ring. A particularly advantageous and, for example, contact-free lubrication and thus bearing can be achieved by means of the sealing elements, such that a particularly secure connection of the rotors can be ensured. Moreover, an advantageous guiding of a, for example, liquid lubricant formed, in particular, as oil for lubricating the axial flow machine can be achieved or the lubricant encroaching into an unwanted region can be avoided. In particular, it is possible to seal and thus to separate a motor chamber from a lubricant chamber, in particular formed as an oil chamber, wherein, for example, the lubricant chamber and/or the motor chamber, for example, is delimited by the housing, in particular directly in each case, and is thus arranged in the housing, for example.

In order to be able to constitute a particularly advantageous lubrication and thus bearing of the rotors, it is provided in a further design of the invention that the toothings are arranged between the sealing elements when viewed in the axial direction of the axial flow machine. This means that the toothings are arranged at a height arranged between the sealing elements in the axial direction of the axial flow machine, such that one of the sealing elements is arranged on the far side of the toothings and the other sealing element on this side of the toothings, in particular when viewed in the axial direction of the axial flow machine. In doing so, the motor chamber mentioned above, for example, can be kept dry, in particular despite bearings, for example, for supporting the rotors on the housing being supplied with the lubricant and thus being oil-lubricated supports, for example. In other words, the lubricant with which the supports are supplied, for example, can be prevented from encroaching into the motor chamber, such that the motor chamber can be kept dry. An advantage of this is, in particular, that lubricant-lubricated, in particular oil-lubricated, bearings can have an advantage in terms of lifetime in comparison to supports which are lubricated, for example by means of fat, only once when they are installed.

In a further design of the invention, the axial flow machine has the housing mentioned above, in which the stator and the rotors that can be rotated in relation to the housing are arranged.

Here, it has proved to be advantageous for achieving a particularly adequate bearing and lubrication when the axial flow machine has a first sealing lip, by means of which one of the rotors is sealed or is to be sealed against the housing. Furthermore, the axial flow machine preferably has a second sealing lip, by means of which the other rotor is sealed or is to be sealed against the housing. For example, the respective sealing lip is formed from a rubber. Furthermore, it is, in conceivable that the respective sealing lip can be formed to be at least substantially V-shaped, such that the respective sealing lip is formed as a V-sealing lip, for example. Preferably, the respective sealing lip is fixed to the respective rotor and can thus be rotated along with the respective rotor in relation to the housing. Thus, it is preferably provided that the respective sealing lip only abuts on the housing, in particular directly, when the rotors are at a standstill, i.e., when the rotors are not rotating in relation to the housing. With an operation of the axial flow machine formed as an electric machine and thus when the rotors are rotated in relation to the housing, in particular together, wherein the sealing lips rotate along with the rotors, the sealing lips lift off from the housing, such that the sealing lips no longer abut on the housing. Thus, when the rotors rotate in relation to the housing, a degree of friction between the sealing lips and the housing can be avoided, such that a particularly friction-free operation with only a minimal loss of performance can be depicted.

In order to be able to achieve a particularly efficient operation in a manner that is particularly favorable in terms of construction space, it is provided in a further design of the invention that the axial flow machine has a first radial bearing point, by means of which one of the rotors is rotatably supported on the housing, in particular at least or exclusively, in the radial direction of the axial flow machine. Moreover, the axial flow machine here has a second radial bearing point, by means of which the other rotor is rotatably supported on the housing, in particular at least or exclusively, in the radial direction of the axial flow machine. Thus, the respective radial bearing point is to be understood to mean that the respective rotor is rotatably supported on the housing on the respective or above the respective radial bearing point at least or exclusively in the radial direction of the axial flow machine. For example, the respective radial bearing point comprises a respective radial bearing, which is arranged between a respective rotor region of the respective rotor and a respective housing region of the housing in the radial direction of the axial flow machine, such that the respective rotor region is supported on the respective housing region in the axial direction of the axial flow machine. Preferably, the respective radial bearing is formed as a roller bearing, in particular as a ball bearing, whereby a particularly friction-free support can be achieved.

In a further particularly advantageous embodiment of the invention, a respective guiding element is provided on the respective rotor, the guiding element being formed to guide the previously mentioned lubricant, which is preferably formed as oil and/or is liquid. The respective guiding element is formed in such a way that it extends in a respective direction running in parallel to the axial direction of the axial flow machine and starting from the respective rotor and pointing away from the respective rotor and from the stator. In particular, it is conceivable that the respective guiding element is formed conically. For example, the respective guiding element is formed as a guide plate, in particular as an oil guide plate. As a result of the respective guiding element extending in the respective direction running in parallel to the axial direction of the axial flow machine, starting from the respective rotor and pointing away from the respective rotor and from the stator, the respective guiding element is positioned from axially inwards to axially outwards, and therefore the respective guiding element runs from radially inwards to radially outwards when viewed in the axial direction of the axial flow machine, whereby the lubricant can be guided particularly advantageously. In doing so, the motor chamber can be kept dry, in particular despite the supply of the bearings with the lubricant.

Finally, it has proved to be particularly advantageous when the axial flow machine has a collecting region for collecting the lubricant, i.e., for at least temporarily receiving the lubricant. For example, the collecting region is arranged in the housing or even outside the housing. In particular when the collecting region is arranged inside the housing, the collecting region is delimited or formed, in particular directly, by the housing.

Moreover, the axial flow machine has a first disposal channel arranged on sides of a first of the rotors, said disposal channel running inside the housing, for example, i.e. inside a first wall of the housing. The lubricant can be guided via the first disposal channel out of a first region in the housing spaced apart from the collecting region into the collecting region. This means that the first region is arranged in the housing and is delimited, in particular directly, by the housing. Furthermore, the axial flow machine preferably has a second disposal channel arranged on sides of the second rotor, the disposal channel preferably running inside the housing, i.e., inside a second wall of the housing. The lubricant can be guided via the second disposal channel out of a second region in the housing spaced apart from the collecting region and from the first region into the collecting region. Thus, the second region is arranged in the housing, wherein the second region is preferably delimited directly by the housing. After the respective bearing has been lubricated by means of the lubricant, the lubricant can flow, for example, from the bearing into the first region or into the second region, whereupon the lubricant can be discharged from the first region or from the second region by means of the respective disposal channel and guided into the collecting region. In doing so, a particularly advantageous and adequate collection and discharge of the lubricant sprayed by the guiding element, in particular, or guided by means of the guiding element can be achieved. In relation to this, it is conceivable, in particular, that, after it has lubricated the respective bearing, the lubricant flows along the rotors and/or along the guiding elements, in particular due to a rotation of the rotors and thus the guiding elements, and is sprayed from the rotors and/or from the guiding elements and, in doing so, is guided into the first region and the second region by means of the guiding elements, from where the lubricant is guided into the collecting region by means of the disposal channels, which are also referred to as disposal conduits. From the collecting region, for example, the lubricant can be guided back to the bearings, i.e., in particular to the radial bearings, and lubricate them. In other words, the previously mentioned bearings can be the previously mentioned radial bearings.

The invention is based, in particular, on the following findings and considerations: the respective previously mentioned at least substantially disc-shaped air gap between the stator and the respective rotor is preferably very narrow. In particular for axial flow machines, also referred to as motors, which work at high rotation speeds, for example in the region of 15,000 revolutions per minute or even above that, it can be significant for reasons of electromagnetic and also mechanical efficiency to keep the air gaps free of oil during the entire operation in order to avoid otherwise occurring shearing losses that would occur if the lubricant or oil or even oil mist were to get into the respective air gap. On the other hand, with the rotation speeds and the narrow air gap between the respective rotor and the stator, a preferably broad-based roller bearing of the rotors is advantageous. Especially at high rotation speeds, such a bearing is to be supplied with fresh oil, preferably permanently, in order to ensure a sufficient lubrication and cooling of roller bodies of the bearings to a sufficient extent. This can be achieved by the invention. The invention thus relates to the rotationally fixed and form-fit connection of the rotors and their bearings and the lubrication of the bearings and to keeping the motor chamber and thus the air gaps between the rotors and the stator reliably free of the lubricant, in particular free of oil, in particular during the whole operation. In addition, preferably motors with a high rotation speed are preferably taken into consideration for driving vehicle axes. The invention makes it possible, in particular, to implement the axial flow machine as a high-rotating axial flow machine in an H-construction and here to also meet high demands of the torsional moment transferring connection of the two rotors to each other and of their bearings and of the lubrication and cooling of these bearings and of keeping the air gaps free of oil, and doing so in a particularly efficient manner.

Further advantages, features and details of the invention emerge from the below description of a preferred exemplary embodiment and by means of the drawings. The features and feature combinations mentioned above in the description and the features and feature combinations mentioned below in the description of the figures and/or only shown in the figures can be used not only in the respectively specified combination, but also in other combinations or on their own, without leaving the scope of the invention.

BRIEF DESCRIPTION OF THE DRAWING FIGURES

Figure 2:
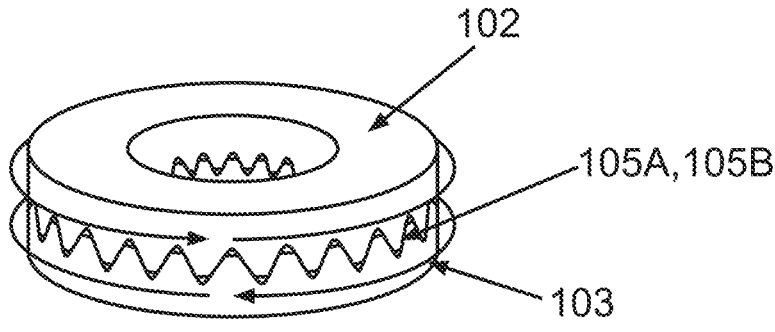
Figure 3:
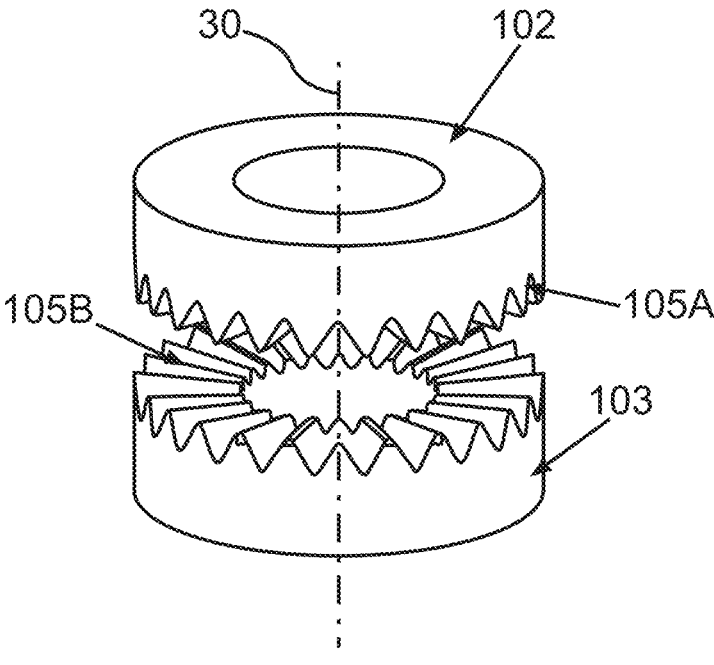

The Drawings Show:

FIG. 1, in a cut-out, a schematic longitudinal sectional view of an axial flow machine for a motor vehicle;

FIG. 2, in a cut-out, a schematic perspective view of rotors of the axial flow machine, the rotors of which are connected to one another in a form-fit and rotationally fixed manner by means of respective toothings; and FIG. 3, a schematic and perspective exploded view of the rotors.

The same or functionally identical elements are provided with the same reference numbers in all the figures.

DETAILED DESCRIPTION

FIG. 1 shows in a cut-out in a schematic longitudinal sectional view an axial flow machine 10, also referred to as a disc engine, in particular for a motor vehicle. This means, for example, that, in its completely produced state, the motor vehicle, preferably formed as a car, in particular as a passenger car, can have the axial flow machine 10. The axial flow machine 10 is an electric engine, which can provide torsional moments. In particular, vehicle wheels of an axis of the motor vehicle can be driven by means of the respective torsional moment provided by the axial flow machine 10, whereby the motor vehicle can be driven electrically, in particular entirely.

The axial flow machine 10 has a housing 20, by which a motor chamber 205, for example, is delimited, in particular directly. The axial flow machine 10 furthermore has a stator 101 and rotors 102 and 103. The rotors 102 and 103 can be rotated, in particular together or simultaneously, around a machine axis of rotation 30, also simply referred to as the axis of rotation, in relation to the housing 20 and in relation to the stator 101. In particular, the axial flow machine 10 can provide the torsional moments mentioned above via the rotors 102 and 103. It can be seen from FIG. 1 that the stator 101 and the rotors 102 and 103 are each arranged at least partially, in particular at least predominantly and thus by more than half, in the housing 20 and here, in particular, in the motor chamber 205. The machine axis of rotation 30 is an axis of symmetry, for example, in relation to which the respective rotor 102, 103 and/or the stator 101, for example, is formed to be rotationally symmetrical. Moreover, the machine axis of rotation 30 is also referred to as the rotation axis, since the rotors 102 and 103 and the rotation axis can be rotated in relation to the housing 20 and in relation to the stator 101.

The rotors 102 and 103, for example, form a whole rotor of the axial flow machine 10, which can provide the torsional moments mentioned above via its total engine. In particular, the rotors 102 and 103, for example, form the entire rotor by the rotors 102 and 103 being connected to each other in a form-fit and rotationally fixed manner, which is explained in yet more detail below. The stator 101 is fixedly mounted to the housing, i.e., is connected to the housing 20 in a rotationally fixed manner. In particular, the rotors 102 and 103 can be driven by means of the stator 101 and thus can be rotated around the machine axis of rotation 30 in relation to the housing 20 and in relation to the stator 101. The rotors 102 and 103 preferably implemented separately from each other each have a rotor body 102A, 102B. Magnets 103A and 103B, for example, are held on the rotor bodies 102A and 102B, in particular in such a way that the rotor bodies 102A and 102B each at least partially receive the magnets 103A and 103B. In particular, the magnets 103A and 103B are formed as permanent magnets. The magnets 103A and 103B are covered by means of a respective closing disc 104A, 104B in the axial direction of the axial flow machine 10 towards the stator 101, such that the rotor bodies 102A and 102B or the rotors 102 and 103 terminate so to speak above the closing discs 104A and 104B in the axial direction of the axial flow machine 10 towards the stator 101. In particular, it can be seen from FIG. 1 that the stator 101 is arranged between the rotors 102 and 103 in the axial direction of the axial flow machine 10.

In order to now be able to non-rotationally connect the rotors 102 and 103 to each other in a particularly compact and secure manner, the rotors 102 and 103 are connected to each other in a form-fit and rotationally fixed manner by means of respective toothings 105A and 105B arranged on sides S1 and S2 of the rotors 102 and 103 facing towards each other in the axial direction of the axial flow machine 10 and engaging with one another. The toothing 105A is here arranged on the side S1 of the rotor 102 facing towards the side S2 of the rotor 103 and is thus a first toothing of the rotor 102 also referred to as the first rotor. The toothing 105B is arranged on the side S2 of the rotor 103 facing towards the side S1 of the rotor 102 and is thus a second toothing of the rotor 103 also referred to as the second rotor. In the exemplary embodiment shown in FIG. 1, as can be seen particularly well when considering FIGS. 2 and 3 together, the toothings 105A and 105B are formed as Hirth toothings, such that the Hirth toothings engaging with each other form an entire Hirth toothing. In particular, the respective toothing 105A, 105B is a frontal toothing, such that the entire Hirth toothing is a Hirth frontal toothing. It can be seen that the toothing 105A is provided on the rotor body 102A and the toothing 105B on the rotor body 102B, such that the rotor bodies 102A and 102B and thus the rotors 102 and 103 can be connected to each other by means of the toothings 105A and 105B in a manner transferring torsional moments, self-centering and at least virtually play-free. In order to produce this connection, for example, and to receive axial forces in it that emerge under torsional load, the rotor bodies 102B and 102A and thus the rotors 102 and 103 are braced together by means of a hollow screw 106 in the axial direction of the axial flow machine 10. The hollow screw 106 is a screw element, which is hollow over its entire axial extension. Here, the stator 101 has an, in particular, central through opening 22, in which the toothings 105A and 105B are received, in particular completely in each case. Moreover, the hollow screw 106 is arranged at least partially in the through opening 22. In other words, at least one longitudinal region of the hollow screw 106 is arranged in the through opening 22.

Presently, the hollow screw 106 penetrates the through opening 22, in particular in such a way that the hollow screw 106 protrudes on both sides out of the through opening 22 in the axial direction of the axial flow machine 10. For example, the hollow screw 106 has a first thread, in particular a first outer thread. The rotor 103, in particular the rotor body 102B, has a second thread corresponding to the first thread, in particular in the form of a first inner thread. Here, the hollow screw 106 is screwed to the rotor 103, in particular to the rotor body 102B, in particular directly, preferably in such a way that the threads are screwed to each other, i.e., are screwed into each other. Moreover, the hollow screw 106 is supported at least indirectly and presently via a bearing 108A in the axial direction of the axial flow machine 10 on the rotor body 102A and thus on the rotor 102, whereby the rotors 102 and 103 and thus the toothings 105A and 105B are braced together in the axial direction of the axial flow machine 10.

The first thread of the hollow screw 106 is designed as correspondingly rising to either the left or to the right, for example depending on a preferred rotational direction of the axial flow machine 10, also referred to as a motor, i.e., of the rotors 102 and 103 and here, in particular with reference to a forwards gear of the motor vehicle, that can be driven by means of the axial flow machine 10, i.e., designed as a left or right thread, wherein the hollow screw 106 is preferably secured in a form-fit manner, in particular against a rotation running in particular around the machine axis of rotation 30 and taking place in relation to the rotors 102 and 103. In the exemplary embodiment shown in FIG. 1, the hollow screw 106 is arranged concentrically to the machine axis of rotation 30 and thus to the rotors 102 and 103. On an inner periphery, in particular on an inner diameter, of an end of the hollow screw 106 opposite or opposing the first thread of the hollow screw 106, there is preferably a tool receiver 27, also referred to as a tool grip, by means of which a tool, in particular formed as a screw assembly tool, can be connected to the hollow screw 106 in a manner transferring torsional moments, in particular non-rotationally. In doing so, the hollow screw 106 can be rotated, in particular around the machine axis of rotation 30 and in relation to the rotors 102 and 103 by means of the tool, whereby the hollow screw 106 can be screwed to the rotor body 102B, and with that the first thread to the second thread, in order to thus tighten or brace the hollow screw 106 and thus to brace together the rotors 102 and 103 in the axial direction.

The rotor body 102B has an arbitrarily designed and preferably form-fit entrainment 107, for example, in order to conduct i.e., to transfer the respective torsional moment, for example, which is also referred to as a drive moment and which is provided by the axial flow machine 10 via the entire rotor, to at least one or more further parts of a drivetrain of the motor vehicle. For example, the entrainment 107 is formed as a toothing, in particular as a plugin toothing. In particular, the rotors 102 and 103 are components of a rotor assembly, which can also comprise the hollow screw 106. The rotor assembly can be rotated around the machine axis of rotation 30 in relation to the stator 101 and in relation to the housing 20. A rotatable bearing of the rotor assembly and thus the rotors 102 and 103 on the housing 20 is carried out via the bearing 108A and a bearing 108B, which are presently formed as roller bearings and, in particular, as ball bearings. In particular, the bearings 108A and 108B are formed at least or exclusively as radial bearings. Quite particularly, the bearings 108A and 108B are formed as spindle bearings, in particular in a so-called O-arrangement. In a preferred design, the bearing 108A is supported onto the hollow screw 106 or on the hollow screw 106, in particular directly, which in other possible designs, however, does not have to be the case. In the exemplary embodiment shown in FIG. 1, the hollow screw 106 is braced against the rotor 102 in the axial direction of the axial flow machine 10 using a bearing ring, in particular a bearing inner ring, of the bearing 108A.

In particular during an operation of the axial flow machine 10, the bearings 108A and 108B are provided with a preferably liquid lubricant, which is preferably formed as an oil. Thus, in particular during an operation of the axial flow machine 10, a supply of the bearings 108A and 108B, also referred to as an oil supply, with the lubricant preferably formed as oil is carried out. The oil supply of the two bearings 108A and 108B is carried out by an injection of oil, in particular fresh oil, into the hollow screw 106, in particular into its inside. This injection of the oil is illustrated in FIG. 1 by arrows 23 and 24. In other words, for example in a method for operating the axial flow machine 10, said lubricant preferably formed as oil is injected into the hollow screw 106, i.e., into its inside, in particular starting from a first end of the hollow screw 106. For example, the lubricant injected into the inside of the hollow screw 106 can flow out of the hollow screw 106 via at least one or more through openings penetrating the hollow screw 106 and flow to the bearing 108A and lubricate the bearing 108A. Thus, for example, the bearing 108A is arranged in a first region, which can be supplied or is supplied with the lubricant, in order to thus supply the bearing 108A with the lubricant and thus to lubricate it and/or to cool it.

For example, the oil injected into the hollow screw 106, in particular into its inside, can flow out at a second end of the hollow screw 106 opposite the first end of the hollow screw 106 and, as a result, flow to the bearing 108B, in particular via at least one or more further throughflow openings, which are formed, for example, in the rotor 103, in particular in the rotor body 102B. Thus, the lubricant can reach the bearing 108B and, as a result, lubricate and/or cool the bearing 108B. Thus, the bearing 108B is arranged in a second region, which can be supplied with the lubricant, in order to thus cool and/or lubricate the bearing 108B. It is conceivable that the lubricant flowing through the first throughflow opening of the hollow screw 106 alternatively or additionally flows through a further throughflow opening of the rotor 102, in particular the rotor body 102A, in order to thus reach the bearing 108A. As a result of the described injection of the oil, an oil supply from the inside of the hollow screw 106 functioning or formed as a shaft, for example, can be achieved particularly efficiently, without having to use a grinding seal or introducing the oil in opposition to a centrifugal force of the rotating hollow screw 106 into this.

To supply the bearings 108A and 108B with the lubricant, a pump is provided, for example, which is also referred to as an oil pump or lubricant pump. Furthermore, at least one supply conduit, for example, and at least one injection nozzle are provided, wherein the lubricant is guided from the pump to the injection nozzle by means of the supply conduit, for example. The injection nozzle sprays the lubricant out of itself and injects it into the hollow screw 106, as is illustrated by the arrows 23 and 24. The pump, the supply conduit, and the injection nozzle are not depicted in more detail in the Figures. In particular, below the bearing 108A, the hollow screw 106 has an adequate number of first throughflow openings formed, for example, as a first bore distributed on its periphery, the throughflow openings being able to be flowed through by at least one part of the lubricant which is injected into the hollow screw 106, in order to thus finally flow to the bearing 108A. Furthermore, below the bearing 108B, for example, the rotor body 102B has an adequate number of second throughflow openings formed as second bores, for example, distributed on its periphery, the throughflow openings being able to be flowed through by at least one further part of the lubricant, which is or has been injected into the hollow screw 106, in order to finally supply the bearing 108B with the lubricant. In particular, a throughflow of the lubricant through the throughflow openings is caused by means of the centrifugal force, which acts outwardly in the radial direction of the axial flow machine 10 when the rotor assembly rotates, and thus forces the lubricant through the throughflow openings. The bearing 108B also has a bearing inner ring. The bearing inner rings are also referred to as inner rings and each have, on their inner side, for example, an adequate number of recesses, distributed on their respective periphery, in order to ensure a throughflow of the lubricant to the bearings 108A and 108B, in particular to the roller bodies. In doing so, the two bearings 108A and 108B can be sufficiently supplied with lubricant. The respective bearing 108A and 108B moreover has a respective bearing outer ring, also simply referred to as an outer ring. The respective outer ring is formed to be more protruding, for example, in particular in comparison to the respective inner ring, in order to function, for example, as an oil or lubricant catching lip. Alternatively, or additionally to this, a catching element mounted on the respective outer ring, in particular into the respective outer ring, serves to catch or guide the lubricant, which catching element can be formed as a catching sheet or oil catching sheet, for example.

Since the toothings 105A and 105B would allow a throughflow of the lubricant between their tooth base curvings and their tooth heads, two sealing elements formed as O-rings, for example, and also simply referred to as seals 109 and 110, are provided between the hollow screw 106 and the respective rotor body 102A or 102B. It is thus conceivable that the hollow screw 106 is sealed against the rotor body 102A and thus against the rotor 102 by means of the seal 109, and the hollow screw 106 is sealed against the rotor body 102B and thus against the rotor 103 by means of the seal 110. On one hand, the seals 109 and 110 abut directly on the hollow screw 106 and, on the other hand, directly on the respective rotor body 102A or 102B. In particular, the rotor assembly can comprise the seals 109 and 110. Where applicable and thus optionally, a baffle plate 111, also referred to as an oil baffle plate, is provided, in order to realize a storage space for the lubricant. In particular, the lubricant, which flows out of the hollow screw 106 at the second end of the hollow screw 106, can be dammed up by means of the baffle plate 111, in order to cause the oil flowing out of the hollow screw 106 at the second end of the hollow screw 106 to flow through the second throughflow opening of the rotor body 102B and finally to flow to the bearing 108B. A storage space, for example, emerges on the other first end of the hollow screw 106 between a taper, in particular on the inner peripheral side, of the hollow screw 106 and the tool receiver 27 of the hollow screw 106, labelled with 24 in FIG. 1.

A presently conical guiding element in the form of a respective oil conducting sheet 112A, 112B is respectively arranged on the two rotor bodies 102A and 102B and thus on the rotors 102 and 103. It is conceivable that the respective oil conducting sheet 112A, 112B is formed for the targeted and defined guiding of the lubricant and enlarges in a respective direction running in parallel to the axial flow machine 10 starting from the respective rotor 102 or 103 and pointing away from the respective rotor 102, 103 and from the stator 101, wherein the respective direction in relation to the rotor 102 is illustrated by an arrow 25 and in relation to the rotor 103 by an arrow 26. The conical oil guide sheets 112A and 112B extending outwardly in the axial direction guide excessive lubricant as a result of the centrifugal force initiated upon contact of the excessive lubricant with the respective oil guide sheet 112A, 112B below a respective collecting lip 201A, 201B of the housing 20 also referred to an oil catching lip. The lubricant (oil) guided in this way is then drained via disposal channels 202A and 202B, which are also referred to as disposal conduits or oil disposal conduits, either inertially into a collecting region not depicted in more detail and formed, for example, as a sump, in particular as an oil sump, and optionally actively suctioned off. In doing so, the lubricant is kept away from the motor chamber 205, such that an oil freedom of the motor chamber 205 can be ensured.

It is conceivable that the disposal channel 202A is arranged on sides of the rotor 102 and the disposal channel 202B on sides of the rotor 103. Via the disposal channels 202A and 202B, the lubricant can be dissipated out of respective regions spaced apart from the collecting region and arranged in the housing 20 and guided into the collecting region. The first region and the second region are bearing regions or components of bearing regions, wherein the bearings 108A and 108B are arranged in the bearing regions. To prevent a penetration of lubricant out of the respective bearing region into the motor chamber 205 when the axial flow machine 10 is switched off, respective elastically flexible V-seals 113A and 113B are attached to the rotor bodies 102A and 102B and thus to the rotors 102 and 103. This means that the V-seals 113A and 113B are at least substantially V-shaped sealing lips, by means of which the rotors 102 and 103 can be sealed against the housing 20, in particular sealed when the rotors 102 and 103 come to a standstill. The V-seals 113A and 113B have, in particular, direct contact with the respective collecting lip 201A, 201B of the housing via their sealing lip when the rotors 102 and 103 are at a standstill, yet lose this as a result of their particularly elastic and thus reversible deformation due to centrifugal force when the rotors 102 and 103 rotate with increasingly high speeds, in order to completely lift off from a certain rotational speed of the rotors 102 and 103. High speeds of the rotors 102 and 103 is understood to mean that the rotational speed of the rotors 102 and 103 successively increases. Thus, during an operation of the axial flow machine 10, at least from a certain limit rotational speed at which the seals 113A and 113B lift off from the housing 20 and thus no longer abut on the housing 20, there is a completely sliding contact-free lubrication of the bearings 108A and 108B and a seal of the motor chamber 205 in comparison to a lubricant chamber inside the housing 20. The lubricant chamber also referred to as the oil chamber is to be understood to mean a region arranged in the housing 20 and delimited, in particular directly, by the housing 20, the region being supplied with the lubricant, in particular during the operation of the axial flow machine 10, in order to thus lubricate the bearings 108A and 108B. Due to the fact that the seals 113A and 113B do not touch the housing 20 during the operation of the axial flow machine 10 and due to the fact that the motor chamber 205 can be kept at least substantially free of the lubricant during the operation of the axial flow machine 10, a further contribution for a particularly energetic efficiency of the axial flow machine 10 can be realized. Depending on the material or surface quality of the respective catching lip 201A, 201B, a smooth attachment could be advantageous, in order to keep a degree of attrition of the respective seals 113A, 113B, in particular across their respective sealing lip, minimal before the respective V-seal 113A, 113B lifts off from the housing 20, so long as the seal V-113A, 113B still touches the housing 20 and is also rotated in relation to it with the respective rotor 102, 103.

It should be noted as a further advantage of the axial flow machine 10 that the respective Hirth toothing can be designed in such a way that the torsional strength and also the torsional fatigue strength provided by the inner and outer diameter of the two shaft ends connected to each other via the Hirth axial toothings, in this case the shaft stump of the rotor bodies 102A and 102B, is not reduced and can also be transferred safely by the respective Hirth toothings. Thus, no thickening of the shaft ends is required, whereby, even considering the requirement or use of the hollow screw 106 for axially bracing the Hirth toothings, with the stated dimensions of the axial flow machine 10, a greater inner diameter of the entire assembly remains freely available than with others of the torsional moment-transferring connection of the two rotor bodies 102A and 102B, in order to accommodate the shafts of the vehicle drive in it. Furthermore, radial air inlet bores 203A and 203B are located to the left and right of or, in the radial direction, on both sides of the rotor bodies 102A and 102B, in particular above the catching lips 201A and 201B, the air inlet bores guiding or conducting optionally filtered fresh air into the motor chamber 205 of the housing 20. A respective air outlet bore 204A, 204B is arranged above a respective outer diameter of the respective rotor body 102A, 102B in each case, in order to be able to dissipate the fresh air introduced into the motor chamber 205 back out of the motor chamber 205. In doing so, an air circulation in the motor chamber 205 is ensured. The air circulation in the motor chamber 205 is optionally ensured only by the rotating rotors 102 and 103 and enables a dissipation of oil mist possibly entering into the motor chamber 205, from which oil can be recaptured in a condensation chamber. A certain contribution for cooling the rotors 102 and 103 can also be ensured by this air through-flow. In addition, this measure prevents the otherwise optionally possible suctioning of oil mist from the bearing region by the airflow generated by the rotating rotors 102 and 103 in the closed motor chamber 205 of the housing 20.

Toothings 105A and 105B formed as Hirth toothings can be seen particularly well from FIGS. 2 and 3, said toothings being able to ensure a particularly advantageous, form-fit and rotationally fixed connection of the rotors 102 and 103.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMBERS

10 Axial flow machine
20 Housing
22 Through opening
23 Arrow
24 Arrow
25 Arrow
26 Arrow
27 Tool receiver
30 Machine axis of rotation
101 Stator
102 Rotor
103 Rotor
102A Rotor body 102B Rotor body
103A Magnet
104A Closing disc
104B Closing disc
105A Toothing
105B Toothing
106 Hollow screw
107 Entrainment
108A Bearing
108B Bearing
109 Seal
110 Seal
111 Baffle plate
112A Guiding element
112B Guiding element
113A V-seal
113B V-seal
201A Catching lip
201B Catching lip
203A Air inlet bore
203B Air inlet bore
204A Air outlet bore
204B Air outlet bore
205 Motor chamber
S1 Side
S2 Side

The invention claimed is:

1. An axial flow machine for a motor vehicle, the axial flow machine comprising:
   a stator having two rotors that are rotatable relative to the stator, wherein the stator is arranged between the two rotors in an axial direction of the axial flow machine,
   wherein the two rotors are connected to each other in a rotationally fixed manner by respective toothings of the two rotors, wherein the respective toothings of the two rotors are arranged on front sides of the rotors facing towards each other in the axial direction,
   wherein the respective toothings of the two rotors are provided at or on a respective circular ring face of the respective front side of the two rotors,
   wherein the respective toothings of the two rotors are arranged concentrically to a machine axis of rotation,
   wherein the respective toothings of the two rotors directly engage with each other,
   wherein the stator has a through opening in which the respective toothings of the two rotors are arranged, and
   wherein the respective toothings are each completely arranged in the through opening.

2. The axial flow machine of claim 1, wherein the respective toothings are Hirth toothings.

3. The axial flow machine of claim 1, wherein the two rotors and the respective toothings are braced together in the axial direction of the axial flow machine by a screw.

4. The axial flow machine of claim 2, wherein the screw is hollow.

5. The axial flow machine of claim 4, wherein the screw is arranged at least partially in the through opening.

6. The axial flow machine of claim 3, wherein the screw is sealed against a first of the two rotors by a first sealing element and against the second of the two rotors by a second sealing element spaced apart from the first sealing element in the axial direction of the axial flow machine.

7. The axial flow machine of claim 6, wherein the respective toothings are arranged between the first and second sealing elements when viewed in the axial direction of the axial flow machine.

8. The axial flow machine of claim 1, further comprising:
   a housing in which the stator and the two rotors, which are rotatable relative to the housing, are arranged.

9. The axial flow machine of claim 8, further comprising:
   a first sealing lip configured so that one of the rotors is sealed or is to be sealed against the housing; and
   a second sealing lip configured so that the other one of the two rotors is sealed or is to be sealed against the housing.

10. The axial flow machine of claim 9, further comprising:
   a first radial bearing point configured to rotatably support one of the two rotors on the housing in the radial direction of the axial flow machine; and
   a second radial bearing point configured to rotatably support the other one of the two rotors on the housing in the radial direction of the axial flow machine.

11. The axial flow machine of claim 10, further comprising:
   a respective guiding element provided on the respective one of the two rotors, wherein the respective guiding element is configured to guide a lubricant and extends in a respective direction running in parallel to the axial direction of the axial flow machine, starting from the respective one of the two rotors and pointing away from the respective one of the two rotors and from the stator when viewed from radially inwards to radially outwards.

12. The axial flow machine of claim 10, further comprising:
   a collecting region configured to collected a lubricant;
   a first disposal channel arranged on sides of a first of the two rotors, wherein the first disposal channel is configured so that the lubricant is guidable out of a first region in the housing spaced apart from the collecting region into the collecting region; and
   a second disposal channel arranged on sides of a second of the two rotors, wherein the second disposal channel is configured so that the lubricant is guidable out of a second region in the housing spaced apart from the collecting region and from the first region into the collecting region.

* * * * *